US008310457B2

(12) United States Patent  
Faubert et al.

(10) Patent No.: US 8,310,457 B2  
(45) Date of Patent: Nov. 13, 2012

(54) PORTABLE ELECTRONIC DEVICE INCLUDING TACTILE TOUCH-SENSITIVE INPUT DEVICE AND METHOD OF PROTECTING SAME

(75) Inventors: Perry Allan Faubert, Kitchener (CA); Jason Tyler Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 692 days.

(21) Appl. No.: 12/494,524

(22) Filed: Jun. 30, 2009

(65) Prior Publication Data

US 2010/0328230 A1 Dec. 30, 2010

(51) Int. Cl.
*G06F 3/041* (2006.01)
(52) U.S. Cl. .................... 345/173; 178/18.01
(58) Field of Classification Search .......... 345/173; 310/311; 178/18.01
See application file for complete search history.

(56) References Cited

U.S. PATENT DOCUMENTS

| 6,751,552 | B1 * | 6/2004 | Minelli ............ 701/454 |
| 6,898,525 | B1 * | 5/2005 | Minelli ............ 701/472 |
| 2005/0212777 | A1 * | 9/2005 | Ing et al. ......... 345/173 |
| 2005/0248236 | A1 * | 11/2005 | Lee et al. ........ 310/328 |
| 2006/0284833 | A1 * | 12/2006 | Lin et al. ........ 345/156 |
| 2007/0035202 | A1 * | 2/2007 | Imai ................ 310/311 |
| 2008/0070703 | A1 * | 3/2008 | Campo et al. ..... 463/46 |
| 2009/0115734 | A1 |  5/2009 | Fredriksson |

FOREIGN PATENT DOCUMENTS

| DE | 20180024 U1 | 11/2001 |
| EP | 1574934 A | 9/2005 |
| JP | 2007228431 A | 9/2007 |

OTHER PUBLICATIONS

EESR dated Jan. 28, 2010 issued in respect of corresponding European Application No. 09164220.7.

* cited by examiner

*Primary Examiner* — Amare Mengistu  
*Assistant Examiner* — Vinh Lam  
(74) *Attorney, Agent, or Firm* — Geoffrey deKleine; Borden Ladner Gervais LLP

(57) ABSTRACT

A portable electronic device includes a housing with a base. A touch-sensitive input assembly is spaced from and moveable relative to the base and a stopping arrangement limits movement of the touch-sensitive input assembly in the direction of the base. An actuating arrangement including a piezoelectric actuator is disposed between the touch-sensitive input assembly and the base for selectively receiving an applied voltage to thereby apply a force to the touch-sensitive input assembly. An accelerometer and functional components are housed within the housing. The functional components include a memory and a processor operably connected to the memory, the touch-sensitive input assembly, the piezoelectric actuator, and the accelerometer to execute a program stored in the memory to monitor signals from the accelerometer and, if a fall is detected based on the signals from the accelerometer, apply a negative voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

17 Claims, 8 Drawing Sheets

PORTABLE ELECTRONIC DEVICE INCLUDING TACTILE TOUCH-SENSITIVE INPUT DEVICE AND METHOD OF PROTECTING SAME

FIELD OF TECHNOLOGY

The present disclosure relates to portable electronic devices that include a touch-sensitive input device including a mechanism for providing tactile feedback for such input devices and the protection of the mechanism for providing tactile feedback.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities.

Devices such as PDAs or smart telephones are generally intended for handheld use and ease of portability. Smaller devices are generally desirable for portability. Touch screen assemblies constructed of a display, such as a liquid crystal display, with a touch-sensitive overlay are useful on such handheld devices as these handheld devices are small and are therefore limited in space available for user input and output devices. Further, the screen content on the touch screen devices can be modified depending on the functions and operations being performed. Touch screen devices that provide tactile feedback are particularly advantageous for providing positive feedback upon selection of a feature on the touch screen.

Such portable electronic devices are commonly mistakenly dropped and are prone to damage as a result. Protection of some components is desirable for such portable electronic devices in the event of a drop.

BRIEF DESCRIPTION OF THE DRAWINGS

Embodiments of the present disclosure will now be described, by way of example only, with reference to the attached Figures, wherein.

DETAILED DESCRIPTION

Figure 1:
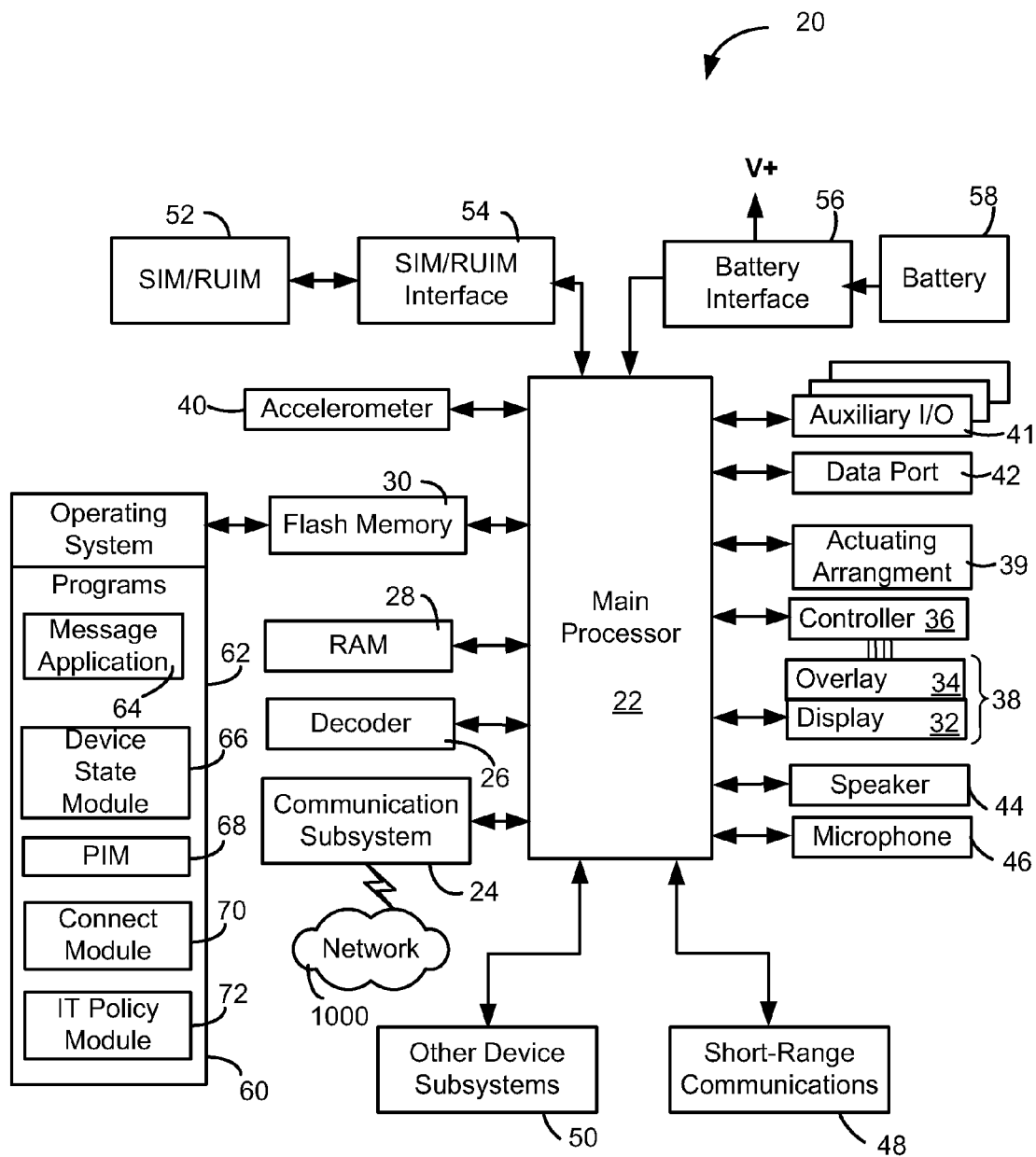
FIG. 1 is a simplified block diagram of components including internal components of a portable electronic device according an aspect of an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Reference is made to the Figures to describe an embodiment of a portable electronic device that includes a touch-sensitive input assembly that is spaced from and moveable relative to the base. A stopping arrangement limits movement of the touch-sensitive input assembly in the direction of the base. An actuating arrangement including a piezo disk actuator is disposed between the touch-sensitive input assembly and the base for selectively receiving an applied voltage to thereby apply a force to the touch-sensitive input assembly. An accelerometer and functional components are housed within the housing. The functional components include a memory and a microprocessor operably connected to the memory, the touch-sensitive input assembly, the piezo disk actuator, and the accelerometer for executing a program stored in the memory for monitoring signals from the accelerometer and, if a fall is detected based on the signals from the accelerometer, applying a negative voltage to the piezo disk actuator causing reverse bending of the piezo disk actuator to permit the stopping arrangement to limit movement of the touch-sensitive input assembly and thereby limit force exerted on the piezo disk actuator between the touch-sensitive input assembly and the base.

Referring to FIG. 1, there is shown therein a block diagram of an example of an embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards, such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the portable electronic device 20 is a GSM/GPRS wireless network in one example implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive overlay 34 connected to an electronic controller 36 that together make up a touch-sensitive display 38, an actuating arrangement, an accelerometer 40, an auxiliary input/output (I/O) subsystem 41, a data port 42, a speaker 44, a microphone 46, short-range communications 48 and other device subsystems 50. The touch-sensitive overlay 34 and the display device 32 provide a touch-sensitive display 38 and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The accelerometer 40 includes a cantilever beam with a proof mass and suitable deflection sensing circuitry. The accelerometer 40 is used for detecting direction of gravitational forces (or gravity-induced reaction forces). Movement of the portable electronic device 20 to alternate orientations is detected and the orientation of the accelerometer 40 and therefore of the portable electronic device 20 can be determined. Further, movement of the portable electronic device 20 can be detected including, for example a drop event if the portable electronic device 20 is dropped.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28. Other software components can also be included, as is well known to those skilled in the art.

The subset of software components 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 41, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 41. A subscriber may also compose data items, such as e-mail messages, for example, using the touch-sensitive overlay 34 on the display 32 that are part of the touch-sensitive display 38, and possibly the auxiliary I/O subsystem 41. The auxiliary I/O subsystem 41 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
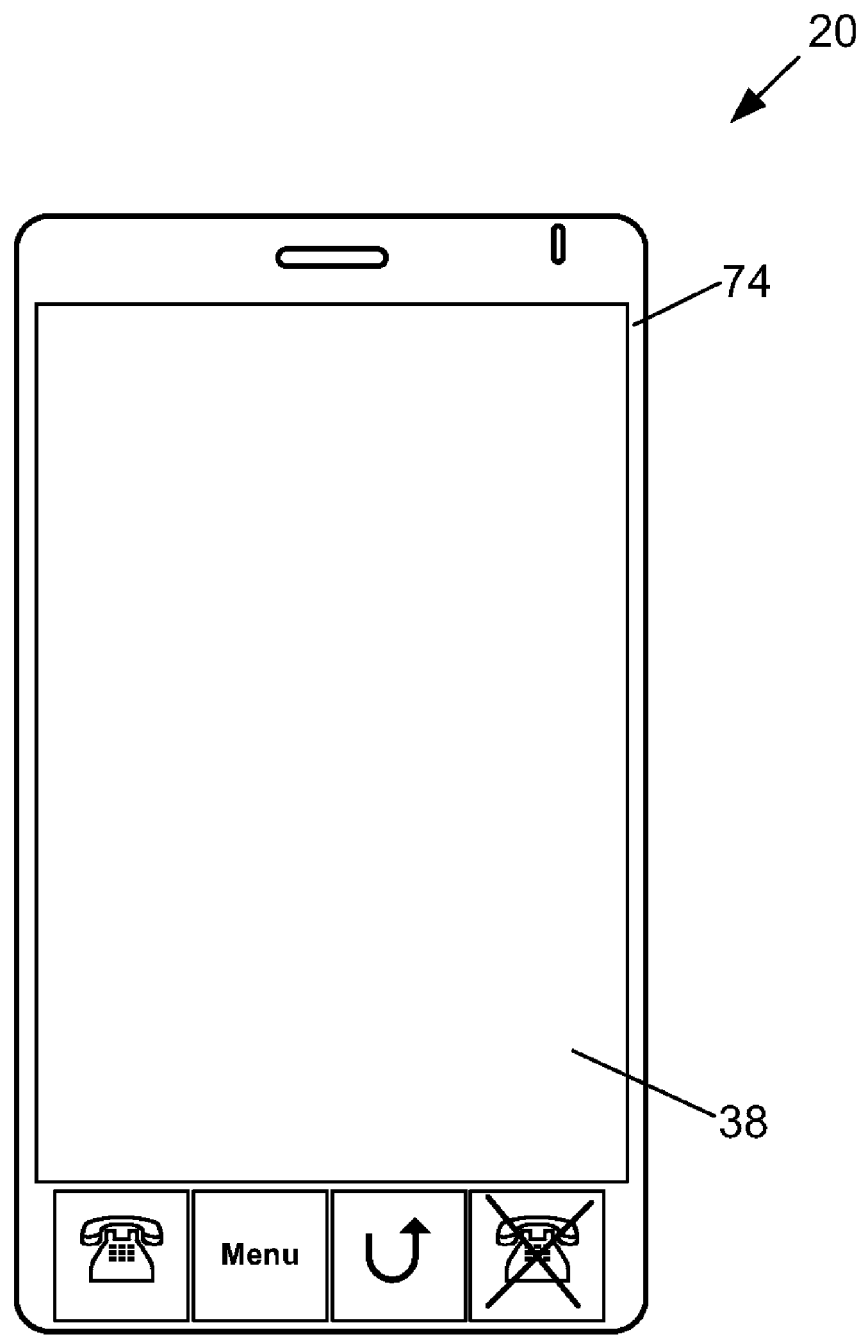
FIG. 2 is a front view of an example of a portable electronic device in a portrait orientation.

Reference is now made to the FIG. 2, there is shown a front view of an example of a portable electronic device 20 in portrait orientation. The portable electronic device 20 includes a housing 74 that houses internal components including internal components shown in FIG. 1 and frames the touch screen display 38 such that the touch screen display 38 is exposed for user-interaction therewith when the portable electronic device 20 is in use. It will be appreciated that the touch screen display 38 may include any suitable number of user-selectable features rendered thereon, for example, in the form of virtual buttons for user-selection of, for example, applications, options, or keys of a keyboard for user entry of data during operation of the portable electronic device 20.

The touch screen display 38 can be any suitable touch screen display such as a capacitive touch screen display. A capacitive touch screen display includes the display 32 and the touch-sensitive overlay 34, as shown in FIG. 1, in the form of a capacitive touch-sensitive overlay. It will be appreciated that the touch-sensitive overlay 34 in the form of a capacitive touch-sensitive overlay is an assembly of a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user resulting in a change in the electric field of each of the touch sensor layers. The signals represent the respective X and Y touch location values. It will be appreciated that other attributes of the user's touch on the touch screen display 38 can be determined. For example, the size and the shape of the touch on the touch screen display 38 can be determined in addition to the location (X and Y values) based on the signals received at the controller 36 from the touch sensor layers.

Referring still to FIG. 2, it will be appreciated that a user's touch on the touch screen display 38 is determined by determining the X and Y touch location and user-selected input is determined based on the X and Y touch location and the application executed by the processor 22. Thus a feature such as a virtual button displayed on the touch screen display 38 may be selected by matching the feature to the X and Y location of a touch event on the touch screen display 38. A feature selected by the user is determined based on the X and Y touch location and the application.

Figure 3:
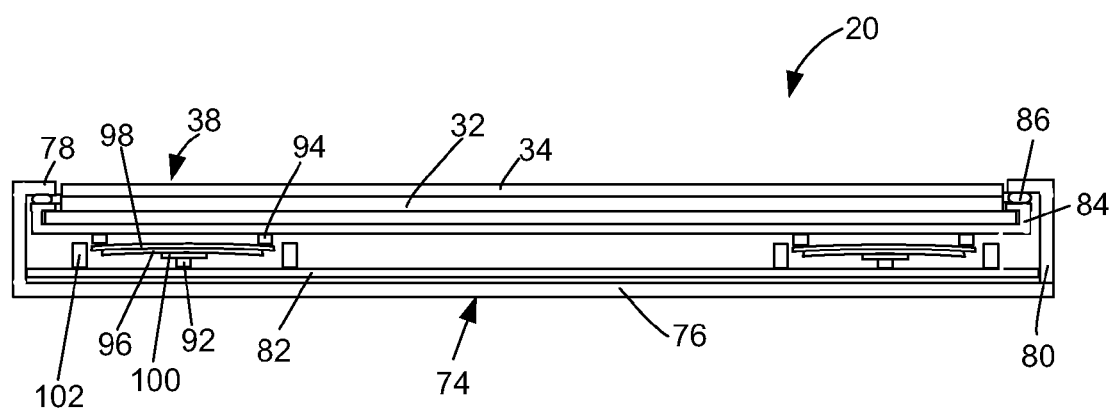
FIG. 3 is a sectional side view of portions of the touch screen display of FIG. 2 (not to scale)

The housing 74 can be any suitable housing for the internal components shown in FIG. 1. As best shown in FIG. 3, the housing 74 in the present example includes a back 76, a frame 78, which frames the touch screen display 38 and sidewalls 80 that extend between and generally perpendicular to the back 76 and the frame 78. A base 82 is spaced from and is generally parallel to the back 76. The base 82 can be any suitable base and can include, for example, a printed circuit board or flex circuit board supported by a stiff support between the base 82 and the back 76. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the example of the portable electronic device 20 shown in FIG. 2, the frame 78 is generally rectangular with rounded corners although other shapes are possible.

Figure 5A:
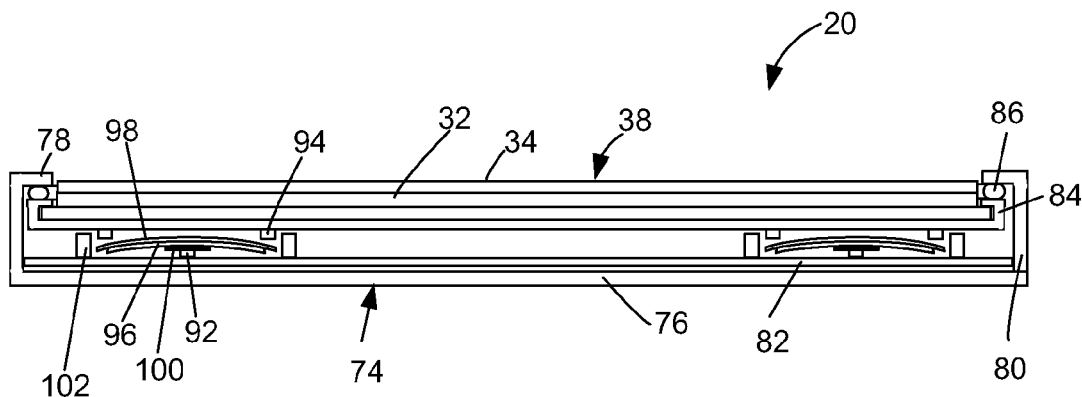
FIGS. 5A and 5B are sectional side views of portions of the touch screen display (not to scale)
Figure 5B:
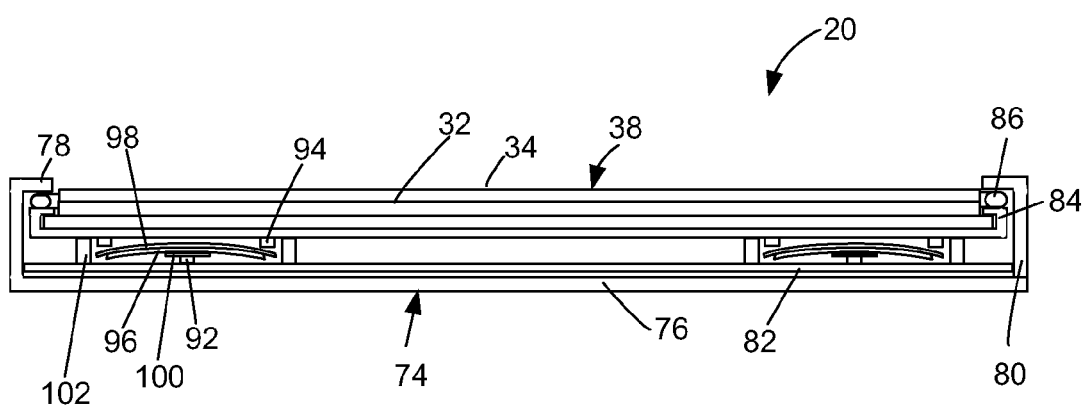

The display 32 and the touch-sensitive overlay 34 can be supported on a support tray 84 of suitable material such as magnesium for providing mechanical support to the display 32 and touch-sensitive overlay 34. A compliant gasket 86 can be located around the perimeter of the frame 78, between an upper portion of the support tray 84 and the frame 78 to provide a gasket for protecting the components housed in the housing 74 of the portable electronic device 20. A suitable material for the compliant gasket 86 includes, for example, a cellular urethane foam for providing shock absorption, vibration damping and a suitable fatigue life. The touch screen display 38 is moveable within the housing 74 as the touch screen display 38 can be moved away from the base 82, thereby compressing the compliant gasket 86, for example. Further, the touch screen display 38 can be moved toward the base 82, thereby compressing the protrusion 92 and applying a force to the piezo disk actuators 90 referred to below. FIG. 3 shows the touch screen display 38 absent an external applied force by a user's finger, for example, during a touch event and with the actuating arrangement 39 absent actuation. FIG. 3 and FIGS. 5A and 5B are not drawn to scale for the purpose of illustration of the actuating arrangement 39 including the piezo disk actuators 90, and the operation of the actuating arrangement 39.

Figure 4:
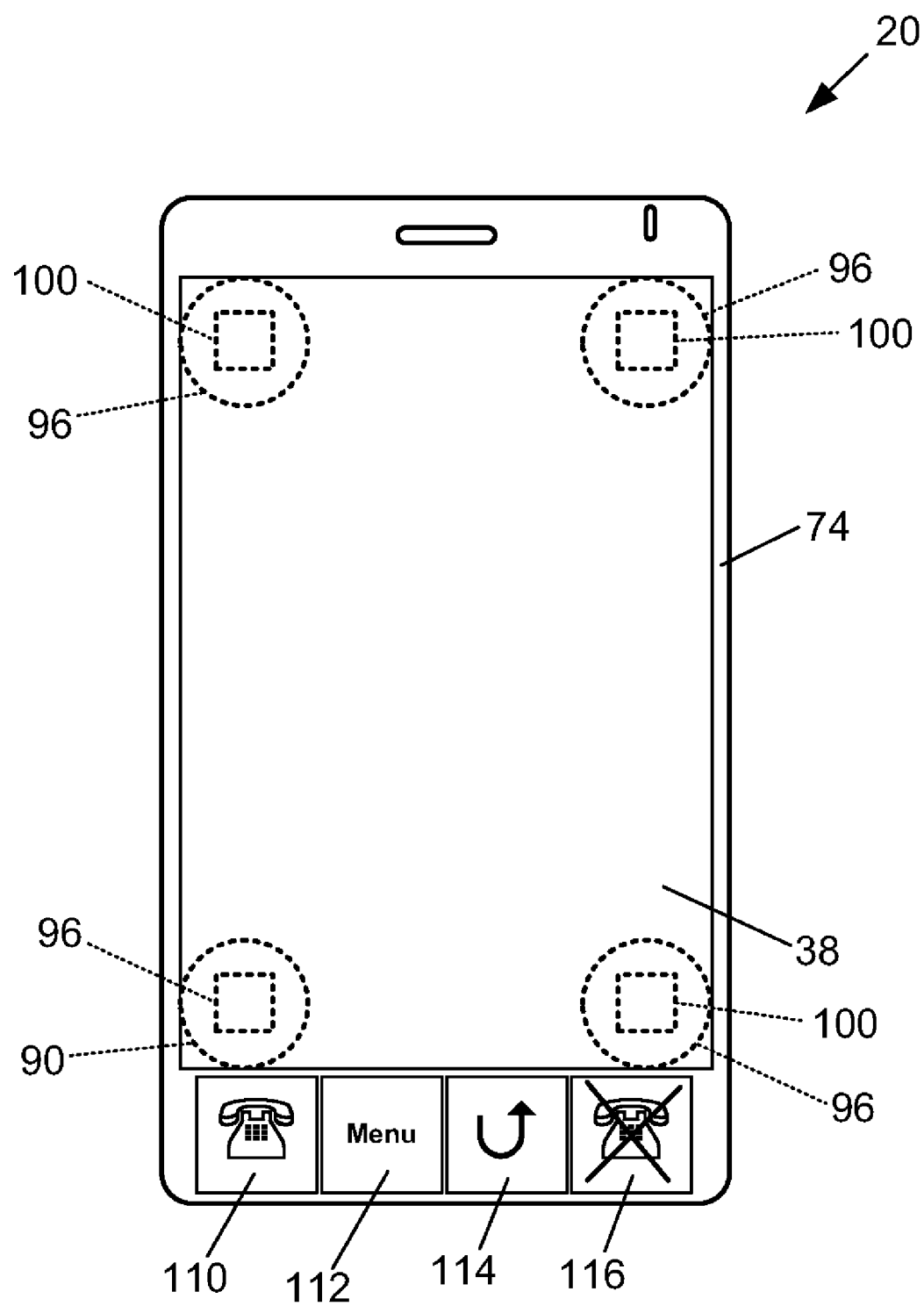
FIG. 4 is a front view of an example of a portable electronic device in a portrait orientation, showing hidden detail in ghost outline.

In the present example, the actuating arrangement 39 includes four piezo disk actuators 90, with each piezo disk actuator 90 supported on a respective protrusion 92. Each protrusion 92 is a cylindrical protrusion on which a respective piezo disk actuator 90 is mounted such that the protrusion 92 engages the respective disk actuator 90 proximal the center of the piezo disk actuator 90. Each protrusion 92 may be made of any suitable material such as a hard rubber and is located between the piezo disk actuator 90 and the base 82. The piezo disk actuators 90 are each located proximal a respective corner of the touch screen display 38, as shown in FIG. 4, on a respective protrusion 92.

Support rings 94 extend from the support tray 84, toward the base 82, each one of the support rings 94 for engaging a respective piezo disk actuator 90 while permitting flexing of the piezo disk actuator 90. The support rings 94 may be made of any suitable material and may be part of the support tray 84 or may connected to the support tray 84.

As best shown in FIG. 3, each piezo disk actuator 90 includes a piezoelectric disk 96 such as a PZT ceramic disk adhered to a metal substrate 98 of larger diameter than the piezoelectric disk 96 for bending when the piezoelectric disk 96 expands or contracts as a result of build up of charge at the piezoelectric disk 96. Each piezo disk actuator 90 is supported on the respective protrusion 92 on one side of the base 82, proximal a respective corner of the housing 74 with each support ring 94 sized such that the edge of the metal substrate 98 contacts the support ring 94 and permits flexing of the piezo disk actuator 90. Thus, each support ring 94 engages a respective piezo disk actuator 90 near a perimeter of the piezo disk actuator 90. A respective force sensor 100 is located between each protrusion 92 and the respective piezo disk actuator 90. A suitable force sensor 100 includes, for example, a puck-shaped force sensing resistor for measuring applied force (or pressure). It will be appreciated that a force can be determined using a force sensing resistor as an increase in pressure on the force sensing resistor results in a decrease in resistance (or increase in conductance).

In the portable electronic device 20, each piezo disk actuator 90 is located between the base 82 and the support tray 84 and force is applied on each piezo disk actuator 90 by the touch screen display 38, in the direction of the base 82, causing bending of the piezo disk actuator 90. Thus, absent an external force applied by the user, for example by pressing on the touch screen display 38, and absent a charge on the piezo disk actuator 90, the piezo disk actuator 90 undergoes a slight bending or preload as shown in FIG. 3. An external applied force in the form of a user pressing on the touch screen display 38 during a touch event, and prior to actuation of the piezo disk actuator 90, causes increased bending of the piezo disk actuator 90 and the piezo disk actuator 90 applies a spring force against the touch screen display 38. When the piezoelectric disk 96 of the present example is charged, the piezoelectric disk 96 expands and causes the metal substrate 94 and piezoelectric disk 96 to apply a further force, opposing the external applied force, on the touch screen display 38 as the piezo actuator 90 straightens. The piezo actuator 90 may not straigten completely or even to the preloaded position shown in FIG. 3 as the external applied force may be greater than the force applied to the touch screen display 38 by the piezo actuators 90.

In the present embodiment each piezo disk actuator 90 is in contact with the respective support ring 94 which is part of or connected to the support tray 84. Thus, depression of the touch screen display 38 by user application of a force thereto is determined by a change in resistance at the force sensors 100 and causes further bending of the piezo disk actuators 90. Further, the charge on each piezo disk actuator 90 can be modulated to control the force applied by the piezo disk actuator 90 on the support ring 94 and the resulting movement of the touch screen display 38. The charge can be modulated by modulating the applied voltage or current. For example, a current can be applied to increase the charge on the piezo disk actuator 90 to provide an applied voltage across the piezo disk actuator 90 and to expand the piezoelectric disk 96 as described above, causing the metal substrate 94 and the piezoelectric disk 96 to straighten as referred to above. The charge therefore results in the force on the touch screen display 38 for opposing the external applied force and movement of the touch screen display 38 away from the base 82. The charge on the piezo disk actuator 90 can also be removed via a controlled discharge current causing the piezoelectric disk 96 to contract again, releasing the force caused by the electric charge and thereby decreasing the force on the touch screen display 38, permitting the touch screen display to return to a rest position, or preloaded position shown in FIG. 3. As indicated above, the movement of the touch screen display 38 and the flexing of the piezo disk actuators 90 is very small.

The applied current can also be reversed to provide a negative applied voltage across each piezo disk actuator 90 and to contract each piezoelectric disk 96 to cause the respective metal substrate and piezoelectric disk 96 to bend in the reverse direction, away from the touch screen display 38, such that each protrusion 92 is located on a concave side of the respective piezo disk actuator 90 and each piezo disk actuator 90 is not in contact with the respective support ring 94, as best shown in FIGS. 5A and 5B. The piezo disk actuator 90 is therefore reverse charged and the reverse charge on the piezo disk actuator 90 can be removed via a controlled current causing the piezoelectric disk 96 to expand again, releasing the force caused by the electric charge and therefore returning to the preloaded position shown in FIG. 3.

A stopping arrangement 102 is also located between the support tray 84 and the base 82 for limiting movement of the touch screen display 38 and support tray 84 in the direction of the base 82. In the present embodiment, the stopping arrangement 102 includes a plurality of cylindrical rings extending from the base 82 and sized to permit movement of the touch screen display 38 and support tray 84 as described above while limiting movement in the direction of the base 82 so that excessive force is not applied to the piezo disk actuators 90 when bent in the reverse direction as described above with reference to FIGS. 5A and 5B. The cylindrical ring can be any suitable material such as a hard rubber. Each one of the cylindrical rings extends around a respective one of the piezo disk actuators 90 and therefore provides protection for a respective one of the piezo disk actuators 90 as movement of the touch screen display 38, support tray 84 and support ring 94 toward the base 82 is limited.

In the present example, a reverse voltage applied across the piezo disk actuators 90 causes bending of the piezo disk actuators 90 as shown in FIG. 5A. Movement of the touch screen display 38, support tray 84 and support ring 94 is limited such when a force is applied to cause the touch screen display 38 to move toward the base 82, the support tray 84 contacts the cylindrical rings of the stopping arrangement 90 rather than the support rings 94 contacting the respective piezo disk actuators 90 as shown in FIG. 5B. Again, movement of the touch screen display 38 and the bending of the piezo disk actuators 90 is exaggerated in FIGS. 5A and 5B for the purpose of illustration.

Figure 6:
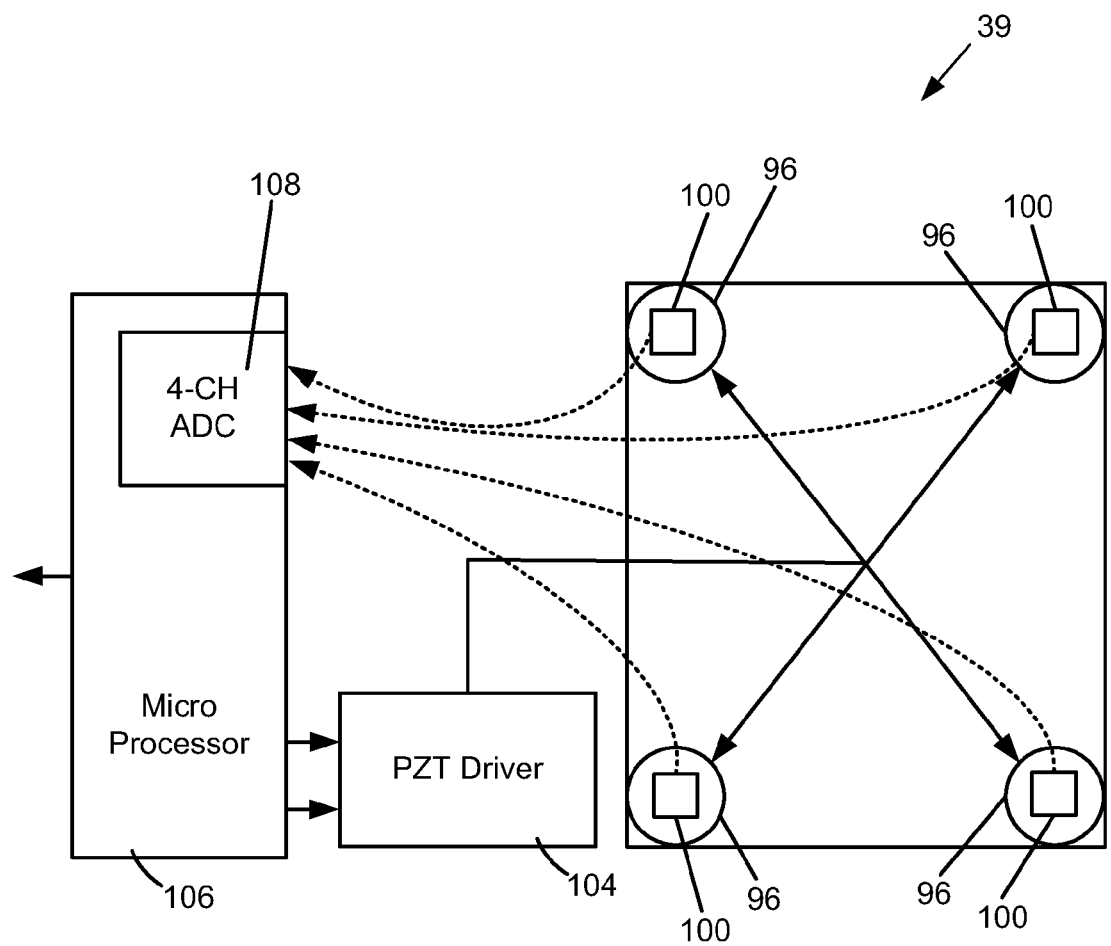
FIG. 6 is a functional block diagram of an actuating arrangement of the portable electronic device.

FIG. 6 shows the actuating arrangement 39 according to one embodiment. As shown, each of the piezo disk actuators 90 is connected to a piezo driver 104 that communicates with a microprocessor 106 including a four-channel amplifier and analog-to-digital converter 108 that is connected to each of the force sensors 100. The microprocessor 106 is also in communication with the main processor 22 of the portable electronic device 20. The microprocessor 106 can provide signals to the main processor 22 of the portable electronic device 20. It will be appreciated that the piezo driver 104 can be embodied in drive circuitry between the microprocessor 106 and the piezoelectric disks 96.

The mechanical work performed by the piezo disk actuator 90 can be controlled to provide generally consistent force and movement of the touch screen display 38 in response to detection of an applied force on the touch screen display 38 in the form of a touch, for example. Fluctuations in mechanical work performed as a result of, for example, temperature, can be reduced by modulating the current to control the charge. Those skilled in the art will appreciate that each piezoelectric disk 96 has similar electrical properties to a capacitor. The mechanical work performed (force*displacement) by the peizo disk actuator 90 can be controlled by controlling the charge, expressed as:

$$Q_{piezo} = C_{piezo} * V_{piezo}$$

where:
Q is charge;
C is capacitance; and
V is voltage.

A coefficient, referred to as the D31 coefficient of a piezoelectric material composition provides the relationship between voltage and force. The D31 coefficient and the relative dielectric constant, (Er) of a given piezoelectric material composition vary inversely with temperature, however. Therefore, if the charge of the piezoelectric disk 96 is controlled within a small range, the variance of the mechanical work of the piezo disk actuator 90 can be small. The current can be controlled as the current flowing in or out of a capacitor (which has similar electrical properties to the piezoelectric disk 96) is given by:

$$I = C * dV/dT$$

where
I is current;
C is capacitance; and dV/dT is differential voltage or instantaneous rate of voltage change.

With I and dT held constant, then as C decreases, dV increases. Thus the charge is controlled since $Q_{piezo} = C_{piezo} * V_{piezo}$.

The microprocessor 106 controls the piezo driver 104 for controlling the current to the piezoelectric disks 96 and thereby controlling the charge, increasing the charge to increase the force on the touch screen display 38 away from the base 82 and decreasing the charge to decrease the force on the touch screen display 38, permitting the touch screen display 38 to move toward the base 82. Further, the microprocessor 106 controls the piezo driver 104 for controlling the current, to reverse the current to the piezoelectric disks 96, and thereby reversing the charge to cause flexing (referred to above as bending) of the piezoelectric disks 96 and respective metal substrates 98 away from the touch screen display 38, as described above.

In the present example, each of the piezo disk actuators 90 are connected to the microprocessor 106 through the piezo driver 104 and are all controlled equally and concurrently. It will be appreciated that the piezo disk actuators 90 can be controlled separately, however.

The portable electronic device 20 can also include physical buttons. In the present example, the portable electronic device 20 includes four physical buttons 110, 112, 114, 116 in the housing 74 for user-selection for performing functions or operations including an "off-hook" button 110 for placing an outgoing cellular telephone call or receiving an incoming cellular telephone call, a Menu button 112 for displaying a context-sensitive menu or submenu, an escape button 114 for returning to a previous screen or exiting an application, and an "on-hook" button 116 for ending a cellular telephone call. Further buttons for performing further functions on the portable electronic device of FIG. 4 may be virtual features rendered on the touch screen display 38.

The portable electronic device 20 is controlled generally by monitoring the touch screen display 38 for a touch event thereon, and modulating a force on the touch screen display 38 for causing a first movement of the touch screen display 38 relative to the base 82 of the portable electronic device 20 in response to detection of a touch event. The force is applied by at least one of the piezo disk actuators 90, in a single direction on the touch-sensitive input surface of the touch screen display 38.

Figure 7:
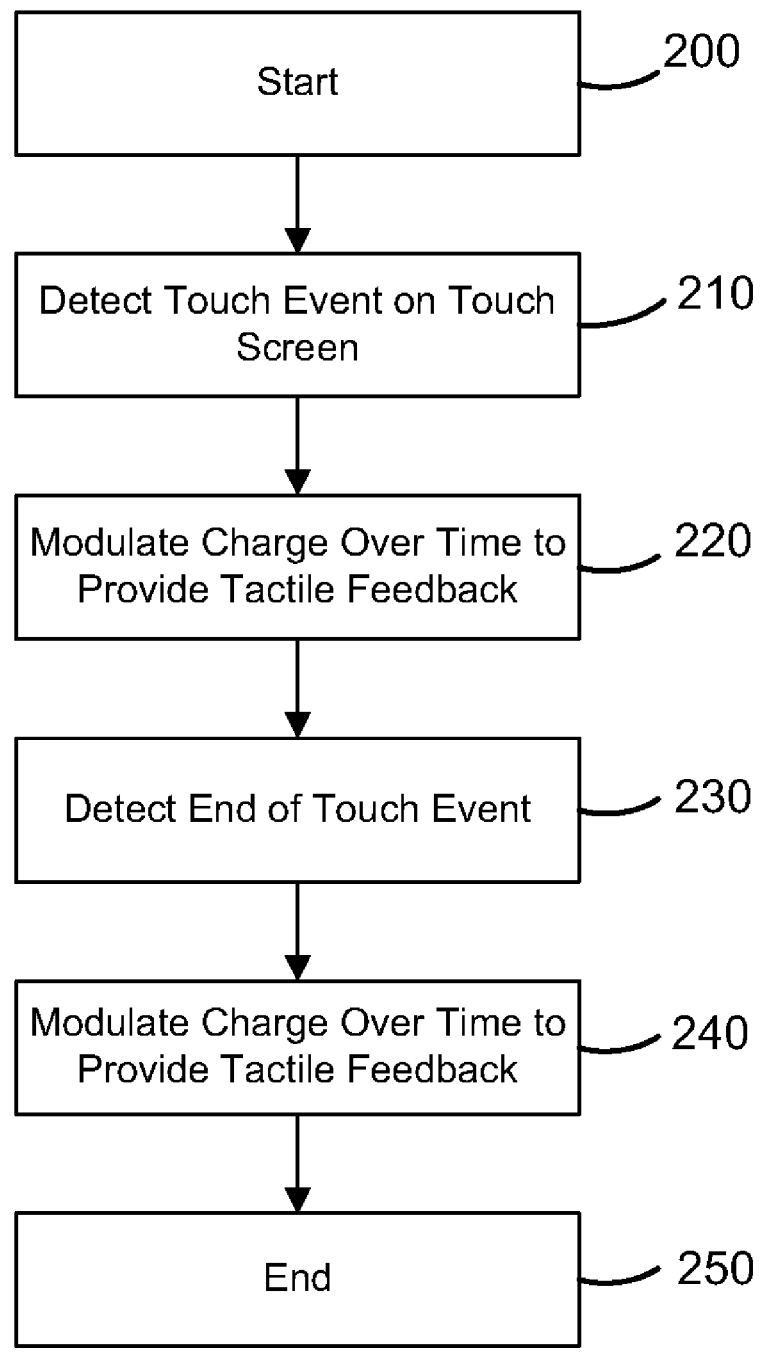
FIG. 7 is a flow chart illustrating a method of controlling a portable electronic device including a touch-sensitive input surface.

Reference is made to FIG. 7 to describe a method of controlling a portable electronic device 20. It will be appreciated that the steps of FIG. 7 can be carried out by routines or subroutines of software executed by, for example, the microprocessor 106. Coding of software for carrying out such steps is well within the scope of a person of ordinary skill in the art having regard to the present description.

The method starts with, for example, the portable electronic device 20 turned to an on or awake state (step 200). The touch screen display 38 is monitored for a touch event (step 210) and, in response to determination of a touch event, the charge at each of the piezoelectric disks 96 is modulated to modulate the force applied by the piezoelectric actuator 90 on the touch screen display 38 to cause movement of the touch screen display 38 for simulating the collapse of a dome-type switch (step 220). When the end of the touch event is detected (step 230), the charge at each of the piezoelectric disks 96 is modulated to modulate the force applied by the piezoelectric actuators 90 to the touch screen display 38 to cause movement of the touch screen display 38 for simulating release of a dome-type switch (step 240). The process ends at step 250. The force is applied by at least one of the piezoelectric actuators 90 in a one direction on the touch-sensitive input surface of the touch screen display 38.

It will be appreciated that the flow chart of FIG. 7 is simplified for the purpose of explanation. A further touch event can be detected again and the steps can be repeated, for example. Further, more than one touch event can occur such that a second touch event can be detected prior to the end of a first touch event. Thus, the charge at each of the piezoelectric disks 96 can be modulated again to modulate the force applied by the piezoelectric actuators 90 to the touch screen display 38 to cause movement of the touch screen display 38 for simulating another collapse of a dome-type switch prior to the end of the first touch event being detected. Similarly, the end of a first one of the touch events can be detected and the charge at each of the piezoelectric disks 96 modulated to modulate the force applied by the piezoelectric actuators 90 to cause movement of the touch screen display 38 for simulating release of a dome-type switch followed by the end of the second one of the touch events being detected and the charge at each of the piezoelectric disks 96 again modulated to modulate the force applied by the piezoelectric actuators to cause movement of the touch screen display 38 for simulating release of a dome-type switch. Therefore, collapse of a dome-type switch can be simulated multiple times in succession prior to simulation of release of a dome-type switch. The release can also be simulated multiple times in succession. The successive simulations can occur rapidly. Further still, multiple dome-type switch collapses in succession can be simulated based on the external applied force. For example, a first simulation of collapse of a dome-type switch can occur at a threshold external applied force and a second simulation of collapse of a dome-type switch can occur at a second, higher threshold external applied force to provide multiple collapse events.

Figure 8:
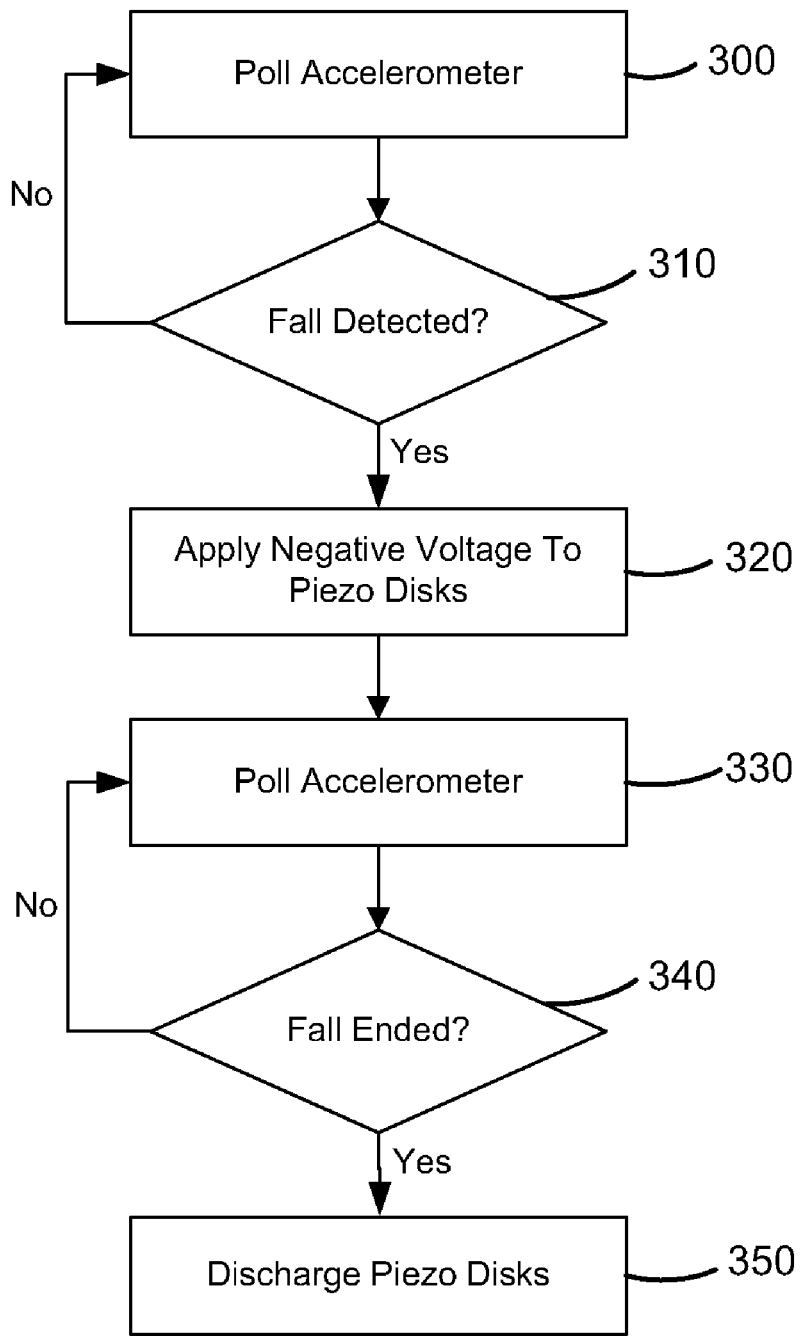
FIG. 8 is a flow chart illustrating a method of protecting components of the portable electronic device according to an embodiment.

Continued reference is made to FIG. 8 to describe an example of the method of controlling a portable electronic device in accordance with the present embodiment. The portable electronic device 20 is turned to an on or awake state in any suitable manner (step 400). In the on or awake state, user-selectable features are rendered on the touch screen display 38. Such user-selectable features can include, for example, icons for selection of an application for execution by the processor 22, buttons for selection of user options, keys of a virtual keyboard, keypad or any other suitable user-selectable icons or buttons.

A force on the touch screen display 38 is detected through the force sensors 100, as a result of a change in resistance at the force sensitive resistors. The force is determined at the microprocessor 106 as a result of signals from the amplifier and four-channel analog to digital converter 108 connected to each of the force sensors 100. Thus, the touch screen display 38 is monitored for a touch event and a touch event on the touch screen display 38 can be detected. Such a touch event can be determined upon determination of an external applied force as a result of a user touch at the touch screen display 38 for selection of, for example, an Internet browser application, an email application, a calendar application, or any other suitable application, option, or other feature within an application (step 210). For the purpose of the present example, the touch event is detected when the force measured at the force sensors 100 exceeds a minimum threshold force. Thus, the measured force at the force sensors 100 is compared to a threshold force and a touch event is detected if the measured force is determined to exceed the threshold force. Conversely, a touch event is not detected as a result of a relatively light touch or brush on the touch screen display 38 with a measured force that is lower than the threshold force. It will be appreciated that the touch-sensitive input surface 34 is thereby monitored for a touch event.

In response to detection of the touch event at step 210, a suitable current is applied to the piezo disk actuator 90, ramping up the charge over a period of time causing flexing of the piezo disk actuator 90 and a resulting force applied to the touch screen display 38 through the support tray 84. The charge is ramped up over a period of time so that the user does not detect the force applied by the piezo disk actuators 90 on the touch screen display 38. Next, the electrical charge is reduced by a suitable controlled discharge current and the resulting force applied by the piezo disk actuator 90 on the touch screen display 38 is reduced over a very short period of time relative to the period of time for ramping up the charge, for simulating collapse of a dome-type switch (step 220).

Next, the end of the touch event is detected (step 230). When the measured force at the force sensors is reduced to a force below a predetermined force, the end of the touch event is detected. The predetermined force can be lower than the threshold force described above for reducing the chance of false detection of an end of a touch event and successive start of another touch event if the external applied force hovers such that the measured force hovers at about the threshold applied force. A suitable current is applied to the piezo disk actuator 90, causing an increase in charge, flexing of the piezo disk actuator 90 and a resulting force to be applied to the touch screen display 38 through the support tray 84 over a relatively short period of time compared to the period of time for ramping up the charge, for simulating release of a dome-type switch (step 240). Next, the electrical charge is reduced and the resulting force applied by the piezo disk actuator 90 on the touch screen display 38 is reduced by ramping down over a long period of time compared to the period of time for increasing charge to simulate release.

The charge and discharge current applied to the piezoelectric disk 96 is therefore modulated to modulate the force from the piezo disk actuators 90 on the touch screen display 38 for providing a desirable tactile feedback by simulating collapse of a dome-type switch in response to detection of the touch event and by simulating release of a dome-type switch upon detection of an end of the touch event.

The process ends at step 250.

The microprocessor 106 can provide a signal to the main processor 22 of the portable electronic device 20 when the measured force at the force sensors 100 as a result of the external applied force exceeds the threshold. Similarly, the microprocessor 100 can provide a signal to the main processor 22 of the portable electronic device 20 when the external applied force is reduced so that the measured force at the force sensors 100 falls below the predetermined force. Thus, the main processor 22 of the portable electronic device 20 can receive input from the actuating arrangement 39. Further, the main processor 22 can communicate with the microprocessor 106 to control the microprocessor 106 and thereby control the actuating arrangement 39. Thus, the overall operation can be controlled by the processor 22.

Reference is now made to FIG. 8 to describe the operation of the portable electronic device 20 in accordance with an embodiment. It will be appreciated that the steps of FIG. 8 can be carried out by routines or subroutines of software executed by, for example, the processor 22 and the microprocessor 106. Coding of software for carrying out such steps is well within the scope of a person of ordinary skill in the art having regard to the present description.

The accelerometer 40 is polled for signals to determine status of the portable electronic device 20 (step 300). If a fall is not detected (step 310), the method returns to step 300 where the accelerometer 40 is again polled. If a fall is detected as a result of, for example, dropping the portable electronic device 20, the fall is determined based on the signals from the accelerometer (step 310) and the method proceeds to step 320. A reverse voltage is applied across the piezo disk actuators 90 over a very short period of time. A reverse voltage is applied across the piezo disk actuators 90 by reversing the applied current to negatively charge each piezoelectric disk 96. Each piezoelectric disk 96 contracts as a result of the negative charge and each metal substrate 98 and respective piezoelectric disk 96 flexes by bending away from the touch screen display 38. Next, the accelerometer 40 is again polled (step 330) and if it is determined at step 340 that the fall has not yet ended based on the signals from the accelerometer 40, the method returns to step 330. If, however, it is determined that the fall has ended at step 340, the reverse charge on each of the piezoelectric disks 96 is discharged, to return the piezoelectric disks to the uncharged state. The method then returns to step 300 where the accelerometer 40 is again polled.

It will be appreciated that the flow chart of FIG. 8 is simplified for the purpose of explanation. Further steps and substeps may occur that are not described herein.

Continued reference is made to FIG. 8 to describe an example of the embodiment shown. The present example is provided for the purpose of illustration. As indicated, the accelerometer 40 is polled for status signals (step 300). In the present example, the main processor 22 polls the accelerometer 40. The signals are analyzed at the main processor 22 and it is determined if the portable electronic device 20 is falling, for example, as a result of being dropped (step 310). According to the present example, the processor 22 polls the accelerometer 40. A fall or drop can be determined based on the signals from the accelerometer 40 resulting from the acceleration produced by gravity. If a drop is not detected, the method returns to step 300 where the accelerometer 40 is again polled by the main processor 22. Thus, portable electronic device 20 continually monitors for a drop or fall.

If a fall is detected as a result of, for example, dropping the portable electronic device 20, the fall is determined based on the signals from the accelerometer (step 310) and the method proceeds to step 320. In the present example, the main processor 22 sends a signal to the microprocessor 106 for application of the reverse voltage. The microprocessor 106 controls the piezo driver 104 for driving the piezo disk actuators 90. A reverse voltage is applied across the piezo disk actuators 90 over a very short period of time. For example, in a system in which four 75 nF piezoelectric disks 96 have a current charging capability of 50 mA, a 50 mA charge current applied at 100% duty cycle and 300 nF of capacitance charged to 200V, the time to charge is about 1.2 mS. Thus, a voltage of up to 200V may be applied to charge the piezo disk actuators over a period of about 1 ms. Alternatively, the voltage may be applied directly without limiting the charge current to thereby cause bending of the piezo disk actuators 90 in a very short period of time of 30 uS. Thus, the reverse voltage is applied by applying a current that is the negative or reverse of the current applied to modulate the charge to provide tactile feedback on the touch screen display 38. Each piezoelectric disk 96 contracts as a result of the applied voltage and the respective metal substrate 98 and piezoelectric disk 96 bend in the reverse direction, away from the touch screen display 38, such that each protrusion 92 is located on a concave side of the respective piezo disk actuator 90 and the piezo disk actuator 90 is not in contact with the respective support ring 94, as best shown in FIGS. 5A and 5B. Each piezo disk actuator 90 is therefore reverse charged. Thus, when a fall is detected, the piezo disk actuators 90 each flex away from the touch screen display 38 to permit the stopping arrangement to limit movement of the touch-sensitive input assembly and thereby limit forces exerted on the piezo disk actuators 90 by movement of the touch screen display 38. If the portable electronic device 20 is dropped such that a force is exerted on the touch screen display 38 toward the base 82 as a result of impact of the portable electronic device 20 with a surface that the portable electronic device 20 lands on, the touch screen display 38 and the support tray 84 can move toward the base 82 only until stopped by the stopping arrangement 102.

Next, the accelerometer 40 is again polled (step 330) by the main processor and if it is determined at step 340 that the fall has not yet ended based on the signals from the accelerometer 40, the method returns to step 330. If, however, it is determined that the fall has ended at step 340, the main processor 22 sends a signal to the microprocessor 106 for discharging the piezoelectric disks 96. The microprocessor 106 controls the piezo driver 104 for driving the piezo disk actuators 90 and a suitable current is applied to discharge each piezoelectric actuator 90. Thus, the reverse charge on each of the piezoelectric disks 96 is discharged, to return the piezoelectric disks 96 to the uncharged state, thereby causing each piezoelectric disk 96 to expand again, releasing the force caused by the electric charge and returning the piezo disk actuators to the preloaded position shown in FIG. 3. The method then returns to step 300 where the accelerometer 40 is again polled.

In the above example, the main processor 22 polls the accelerometer 40 and communicates with the microprocessor 106 to control the piezo driver 104 for controlling the charge on the piezoelectric disks 96. It will be appreciated that the microprocessor 106 may poll the accelerometer directly. Alternatively, the main processor 22 may be connected to the piezo driver 104. The microprocessor 106 and main processor 22 may therefore be embodied in a single device.

In the embodiment described above, the piezoelectric disk 96 such as a PZT ceramic disk is adhered to a metal substrate 98. Alternatively, the piezoelectric disk 96 may be adhered to a suitable ceramic substrate.

The stopping arrangement 102 limits movement of the touch-sensitive display 38, the support tray 84 and the support rings 94 in the direction of the base 82 and thereby limits forces including tensile forces on the piezoelectric disks 96 caused by the touch screen display 38 moving toward the base 82. The piezoelectric disks 96 are therefore protected from stresses applied as a result of forces from the touch screen display 38 upon an impact after dropping the portable electronic device 20. Thus, the piezoelectric disks 96 of the portable electronic device 20, which may be susceptible to damage as a result of a fall, are protected.

The actuating arrangement 39 provides a relatively thin device for providing a desirable tactile feedback to the user without adding significantly to the thickness of the portable electronic device 20. Further, the actuating arrangement 39 can be controlled to provide tactile feedback upon detection of a touch event such that tactile feedback that simulates actuation of a dome-type switch is provided for each touch event. Further, the actuating arrangement 39 can be protected in the event of a drop or fall.

According to one aspect, there is provided a portable electronic device including a housing with a base. A touch-sensitive input assembly is spaced from and moveable relative to the base and a stopping arrangement limits movement of the touch-sensitive input assembly in the direction of the base. An actuating arrangement including a piezoelectric actuator is disposed between the touch-sensitive input assembly and the base for selectively receiving an applied voltage to thereby apply a force to the touch-sensitive input assembly. An accelerometer and functional components are housed within the housing. The functional components include a memory and a processor operably connected to the memory, the touch-sensitive input assembly, the piezoelectric actuator, and the accelerometer for executing a program stored in the memory for monitoring signals from the accelerometer and, if a fall is detected based on the signals from the accelerometer, applying a negative voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

According to another aspect, there is provided a method of protecting a portable electronic device that includes a housing with a base, a touch-sensitive input assembly spaced from and moveable relative to the base, a stopping arrangement for limiting movement of the touch-sensitive input assembly in the direction of the base, an actuating arrangement comprising a piezoelectric actuator disposed between the touch-sensitive input assembly and the base for selectively receiving an applied voltage to thereby apply a force to the touch-sensitive input assembly, an accelerometer housed within the housing, and functional components in the housing comprising a memory and a processor operably connected to the memory, the touch-sensitive input assembly, the piezoelectric actuator, and the accelerometer. The method includes executing a program stored in the memory for monitoring signals from the accelerometer; and if a fall is detected based on the signals from the accelerometer, applying a negative voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

According to yet another aspect, there is provided a computer-readable medium having computer-readable code embodied therein for execution by a processor in a portable electronic device according to claim 1 for causing the portable electronic device to monitor signals from the accelerometer, and if a fall is detected based on the signals from the accelerometer, apply the negative voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

Advantageously, the piezoelectric disks are protected from stresses applied as a result of the touch screen display moving toward the base upon an impact from dropping the portable electronic device. Impact of the portable electronic device causing excessive tension within the piezoelectric disk may result in failure of the piezoelectric disk. The application of a negative voltage causing reverse bending permits the stopping arrangement to limit movement of the touch-sensitive display in the direction of the base and thereby limits forces including tensile forces on the piezoelectric disk caused by the touch screen display moving toward the base.

The actuating arrangement with the piezoelectric disk provides desirable tactile feedback in response to a touch event on the touch screen display. Controlling the piezoelectric actuator or actuators to simulate actuation of a dome-type switch upon touching the touch-sensitive input surface provides a desirable tactile feedback for confirming receipt of input to the user, thereby providing a positive response and reducing the chance of input errors such as double entry, decreasing use time and increasing user-satisfaction. Further, the piezoelectric disk is thin, therefore not adding significantly to the thickness of the device while providing a desirable tactile feedback to the user.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. A portable electronic device comprising:
   a housing including a base;
   a touch-sensitive input assembly spaced from and moveable relative to the base;
   a stopping arrangement to limit movement of the touch-sensitive input assembly in the direction of the base;
   an actuating arrangement comprising a piezoelectric actuator disposed between the touch-sensitive input assembly and the base to selectively receive an applied voltage to thereby apply a force to the touch-sensitive input assembly;
   an accelerometer housed within the housing; and
   functional components in the housing comprising a memory and a processor operably connected to the memory, the touch-sensitive input assembly, the piezoelectric actuator, and the accelerometer to execute a program stored in the memory to apply a reverse voltage to the piezoelectric actuator, if a fall is detected based on signals from the accelerometer, to cause reverse bending of the piezoelectric actuator to permit the stopping arrangement to limit movement of the touch-sensitive input assembly and thereby limit force exerted on the piezoelectric actuator between the touch-sensitive input assembly and the base.

2. The portable electronic device according to claim 1, wherein the piezoelectric actuator comprises a piezo disk actuator.

3. The portable electronic device according to claim 2, wherein the piezo disk actuator comprises a piezoelectric disk adhered to a metal or ceramic substrate.

4. The portable electronic device according to claim 2, comprising a protrusion between the base and the touch-sensitive input assembly for engaging the piezo disk actuator proximal a center of the piezo-disk actuator.

5. The portable electronic device according to claim 4, wherein the protrusion extends between the base and the piezo disk actuator.

6. The portable electronic device according to claim 5, wherein the piezo disk actuator is mounted on the protrusion.

7. The portable electronic device according to claim 3, wherein the protrusion is disposed on the concave side of the piezo disk actuator during application of the reverse voltage causing reverse bending.

8. The portable electronic device according to claim 3, comprising a support ring between the base and the touch-sensitive input assembly for engaging the piezo disk actuator proximal a perimeter of the piezo disk actuator and wherein said reverse bending of the piezo disk actuator comprises bending away from said support ring.

9. The portable electronic device according to claim 2, comprising a force sensor between the touch-sensitive input assembly and the base for determining an external applied force on the touch-sensitive input assembly.

10. The portable electronic device according to claim 9, wherein the force sensor is disposed between the piezo disk actuator and the base.

11. The portable electronic device according to claim 2 wherein the actuating arrangement comprises a plurality of piezo disk actuators disposed between the touch-sensitive input assembly and the base.

12. The portable electronic device according to claim 11, comprising a piezo driver in communication with the processor for controlling application of voltage including the applied voltage to apply a force to the touch-sensitive input assembly and the reverse voltage for reverse bending of the piezo disk actuators.

13. The portable electronic device according to claim 2, wherein the processor is a microprocessor and the portable electronic device comprises a main processor connected to the microprocessor for communicating therewith.

14. The portable electronic device according to claim 13, wherein the microprocessor is connected to the touch-sensitive display via the main processor.

15. The portable electronic device according to claim 13, wherein the microprocessor is connected to the accelerometer via the main processor.

16. A method of protecting components of a portable electronic device comprising a housing including a base, a touch-sensitive input assembly spaced from and moveable relative to the base, a stopping arrangement to limit movement of the touch-sensitive input assembly in the direction of the base, an actuating arrangement comprising a piezoelectric actuator disposed between the touch-sensitive input assembly and the base to selectively receive an applied voltage to thereby apply a force to the touch-sensitive input assembly, an accelerometer housed within the housing, and functional components in the housing comprising a memory and a processor operably connected to the memory, the touch-sensitive input assembly, the piezoelectric actuator, and the accelerometer, the method comprising:
   executing a program stored in the memory to monitor signals from the accelerometer; and
   if a fall is detected based on the signals from the accelerometer, apply a reverse voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

17. A computer-readable medium having computer-readable code embodied therein, the computer-readable code executable by a processor in a portable electronic device according to claim 1 to cause the portable electronic device to monitor signals from the accelerometer, and if a fall is detected based on the signals from the accelerometer, apply the reverse voltage to the piezoelectric actuator causing reverse bending of the piezoelectric actuator to permit the stopping arrangement to limit movement of the touch-sensitive input assembly and thereby limit force exerted on the piezoelectric actuator between the touch-sensitive input assembly and the base.

* * * * *